UNITED STATES PATENT OFFICE.

WALTER S. BROWN, OF SEATTLE, WASHINGTON, ASSIGNOR TO CARL M. LOVESTED, OF KING COUNTY, WASHINGTON.

PROCESS FOR PRESERVING DRY BATTERIES.

1,368,479.   Specification of Letters Patent.   Patented Feb. 15, 1921.

No Drawing.   Application filed June 11, 1919.   Serial No. 303,306.

*To all whom it may concern:*

Be it known that I, WALTER S. BROWN, a citizen of the United States, residing at Seattle, in the county of King and State of Washington, have invented certain new and useful Improvements in Processes for Preserving Dry Batteries, of which the following is a specification.

This invention relates to an improved process for the preservation and resultant increased life of dry batteries.

Dry batteries quickly deteriorate particularly under damp conditions, and their normal life is materially shortened. It has been heretofore proposed to coat such batteries in an endeavor to protect and preserve them, but all such coatings with which I am familiar become hardened and crack in the handling of the battery, with consequent loss of any appreciable results.

The present process is to provide a coating which will maintain its preservative effect throughout any possible life of the battery, and in providing such coating two dissimilar materials are used, each having an important result in the preservative effect.

In forming the coating I use shellac and asphaltum, or a similar substance. Shellac alone will if exposed to the air become dry and very brittle, and would crack after a very short time, hence the use of shellac alone would be without beneficial effect.

If shellac is protected against exposure to the air, however, that is, is prevented from becoming thoroughly dry, it will retain its sealing effect, will yield under the expansion and contraction of the metal case of the battery, and will preserve the battery against outside influence. It is further desirable that the material used to protect the shellac against complete drying, have a different inherent elasticity from that of the shellac, in order that the outer coating remains at all times as a complete air-excluding covering for the shellac.

Asphaltum has proven by experiment to be an admirable coating and hence is specifically contemplated, though other materials of a similar nature may be used.

In detail, the process consists in dipping the batteries into commercial shellac, allowing the shellacked battery to stand to become partially dry on the outer surface— say for approximately forty-eight hours— and finally coating the shellacked battery with asphaltum, or its equivalent. Under the partial drying, the shellac remains moist next to the battery case, and as the air is excluded by the asphaltum coating, such moist shellac will never become hardened during any possible life of the battery. The battery is thus protected and its life materially increased.

Having thus described the invention, what is claimed, is:—

1. The process of sealing dry batteries consisting in coating the battery cell with shellac, permitting such coating to partially-dry then coating the shellac coated battery cell with a protective coating to prevent air admission to the shellac coating.

2. The process of sealing dry batteries, consisting of incasing the battery cell with a coat of shellac, allowing the same to stand approximately forty-eight (48) hours, then coating the product with asphaltum.

3. The process of sealing dry batteries consisting of coating the battery cell with a material of slight resiliency, allowing it to partially dry, then covering the product with a material of a different degree of elasticity.

In testimony whereof I affix my signature.

WALTER S. BROWN.